March 30, 1965    SHINZABURO YATERA    3,176,313
COMBINED MOVIE CAMERA AND PROJECTOR FOR CONTINUOUS PHOTOGRAPHING
Filed Oct. 28, 1960    6 Sheets-Sheet 4

INVENTOR
SHINZABURO YATERA
By Nenderoth, Lind & Ponack
ATTORNEYS

INVENTOR
SHINZABURO YATERA
ATTORNEYS

March 30, 1965  SHINZABURO YATERA  3,176,313
COMBINED MOVIE CAMERA AND PROJECTOR FOR CONTINUOUS PHOTOGRAPHING
Filed Oct. 28, 1960  6 Sheets-Sheet 6

INVENTOR
SHINZABURO YATERA
By Wenderoth, Lind & Ponack
ATTORNEYS

United States Patent Office 3,176,313
Patented Mar. 30, 1965

3,176,313
COMBINED MOVIE CAMERA AND PROJECTOR
FOR CONTINUOUS PHOTOGRAPHING
Shinzaburo Yatera, 3076 Oaza Kisabe, Katano-cho,
Kitakawachi-gun, Japan
Filed Oct. 28, 1960, Ser. No. 65,671
Claims priority, application Japan, Oct. 30, 1959,
34/34,201
3 Claims. (Cl. 352—194)

This invention relates to a continuous photographing apparatus for a movie camera or for a projector, and more particularly to an apparatus for getting the same natural continuity as human eyes have in representing moving objects by exposing a strip of rapidly fed film to light coming from the objects, and a projector for films produced by this apparatus.

In a known type of a movie camera, the principal parts of which consist of compound lenses to admit light to form images of objects on film, a diaphragm to limit the amount of light admitted and a shutter for passing or intercepting the light to expose the film, moving objects are photographed as a series of pictures by successively opening the shutter in front of the film for passing light at certain intervals for exposure. The interval between openings of the shutter, which is necessary to permit an unexposed part of the film to be brought into position for receiving light, makes it unavoidable that motion of the objects during the interval will not be photographed. Thus there are always parts of the motion unphotographed between adjacent pictures in which motion is recorded on a roll of film, and it is quite impossible to represent the images of the objects with the same natural continuity as do human eyes with the known apparatus for movie cameras.

The object of the present invention is to provide means for continuously photographing the motion of an object without any such intervals in the pictures, and means for projecting them on a screen in as natural a sequence as our eyes see it in actuality.

With this object in view, the present invention provides a continuous photographing apparatus which has a shutter having a part thereof removed for passing light and a reflex mirror for on one hand intercepting light and on the other hand reflecting it in another direction so as to photograph the motion of objects during the necessary interval for feeding the film.

According to the present invention, the breaking of the sequence of the images is avoided. Furthermore, only a single lens unit is needed either for photographing or for projecting, and the mechanism itself is not so different from a known type that any difficulty is found in its handling. Besides, the film, too, may be of the same kind heretofore used, for the present invention requires nothing but the sending of the images of objects to two different places on it in accordance with their sequence by the action of the shutter.

Other and the further objects of the present invention will become apparent from the following specification and claims taken together with the accompanying drawings in which is shown the preferred embodiment of the continuously photographing apparatus for a movie camera and the projector according to the present invention.

Figure 1:
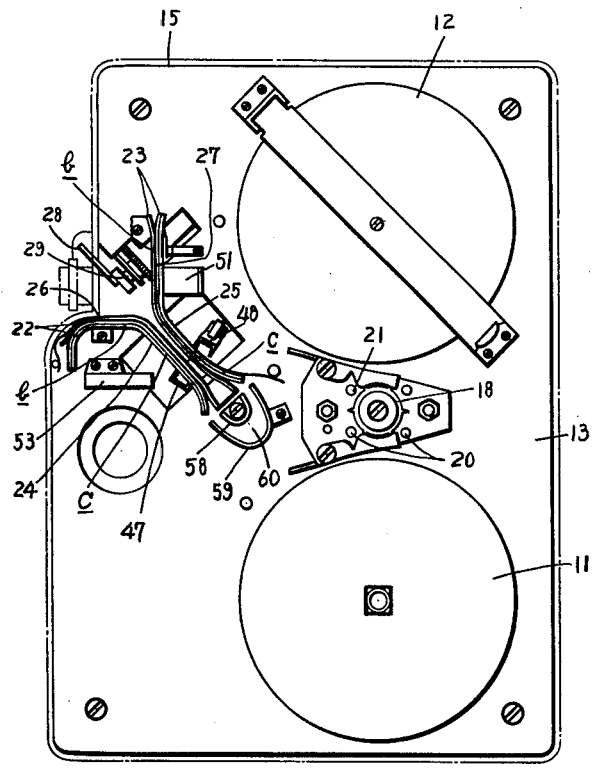
FIG. 1 is an elevation view of the apparatus according to the invention showing the relative position of both reels for film either in photographing or in projecting, a shutter and parts forming a circuit for a film.

In these drawings, the reference numerals 11 and 12 designate a feed reel and a take-up reel, rotatably mounted on shafts 16 and 17 respectively, which are fixed to the plate 13 on one side of a housing 15. On a shaft 19 fixed to the plate 13 between the reels 11 and 12 is mounted a sprocket wheel 18, with guide rollers 20, 20 positioned below it and guide rollers 21, 21 above it. A strip of film a is fed through the passage between these rollers 20, 20 and the sprocket wheel 18 from the reel 11 by means of its perforations, and it is fed through the guide rollers 21, 21 and the upper side of the wheel 18 into the reel 12. On the plate 13 are mounted two film guide means 24 and 25 along which the film is adapted to be fed two frames at a time. Each of these film guide means 24 and 25 is made up of a pair of plates 22 or 23 wide enough to cover the film a and each consisting of a straight photographing part b perpendicular to the corresponding part b on the other film guide means and a feed part c parallel and opposed to the corresponding part c on the other film guide means. In these photographing parts b, b of the plates 22 and 23 are cut exposing apertures 26 and 27. At the rear ends of the feed parts c, c are mounted concentric U-shaped regulating plates 58 and 59, through the passage between which the film a from the film guide means 24 is fed into the film guide means 25 and then to the reel 12 through the wheel 18.

The film a, led through the film guide means 24 and 25 which have the exposing apertures 26 and 27 therein, is to have two parts thereof exposed in the course of its circuit from the reel 11 to the reel 12, and in order to send the light from objects to the apertures 26 and 27 there is provided a shutter 28, which is in the form of a half disc mounted at a point corresponding to the center of the full disc on a shaft 29, the half disc having a reflex mirror 30 on one side thereof and the missing half leaving an opening for passing the light reflected from the object. The shutter is mounted at an angle of 45 degrees to each photographing part b, with the mirror 30 always facing the exposing aperture 26 in the film guide means 24 and the back of the mirror 30 intermittently covering the exposing aperture 27 in the other film guide means 25. This shutter 28 may be also formed of a disc which is equally divided into 4, 6, 8 or more segments each having a reflex mirror thereon so that the reflex mirrors alternate with voids. For such a shutter, the number of revolutions of the shaft 29 must be reduced to ½ for 4 sections, to ⅓ for 6 sections and so on.

Although not shown in the drawings, the housing 15 is further set in a casing as any camera is, and a photographing lens unit is secured outside of it in front of the shutter 28 in such a position as to let the core of light passing through it fall straight upon the photographing part b of the film guide means 25, and is provided with necessary kinds of lenses and movable portions for adjusting the diaphragm and the focusing device.

In this apparatus according to the present invention, the reflex mirror 30 of the shutter 28 is placed behind the lens unit midway between the photographing parts b, b, making an angle of 45° with each of them, so that the light reflected from an object, reflected on the mirror 30, falls on the exposing aperture 26 in the film guide means 24, when the back of the mirror 30 covers the photographing part b of the other film guide means 25. And, on the other hand, when the shutter 28 is rotated 180° by means of the shaft 29 and the mirror 30 is placed in a position opposite to the position shown in FIG. 1, the light from the lens unit goes straight on to the exposing aperture 27 through the void part of the shutter 28. In order to expose the film $a$ to light at the apertures 26 and 27 at different places on the film, it is necessary to feed the film in some regular pattern. In order to do this, the present invention provides a drive mechanism, shown in FIG. 2, which performs a take-up operation of the film $a$ and at the same time synchronous revolution of the shutter 28. The reference numeral 31 designates a shaft fixed to a plate 14 of the housing 15 and revolved by a motor or the like. On the shaft 31 are mounted a worm gear 32 and a gear 33. With the worm gear 32 is engaged a worm 35 on a shaft 34 fixed to the plate 13, and a gear 36 at the end of the shaft 34 revolves a gear 37 mounted on the shaft 29 of the shutter 28. Through a gear 38 the gear 33 revolves a gear 39 mounted on the shaft 16 of the takeup reel 12. The gear 39 is provided with a pin 40. With the gear 33 is engaged a gear 41 on a shaft 42, on which shaft are fixed a disc 43 and a cam 44 loosely positioned in a square opening 45 of a feed lever 46. One end of the feed lever 46 is formed in the shape of a fork $46_1$ to engage with the pin 40, and the other end is provided with two sets of teeth 47, 48, one set of which faces toward cam 44 and engages the perforations in the film in feed part $c$ of the film guide means 24 through an opening cut in the plate 22, and the other set of which faces away from cam 44 and engages the perforations in the film in feed part $c$ of the film guide means 25 through an opening cut on the plate 23.

Figure 2:
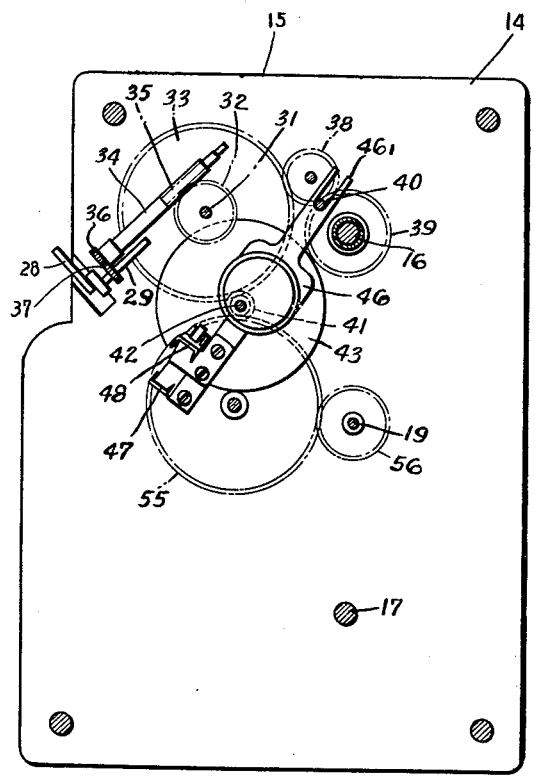
FIG. 2 is an elevation view of the apparatus of FIG. 1 taken on line 2—2 of FIG. 3 and showing the relative position of parts for feeding film and parts for operating the shutter.
Figure 3:
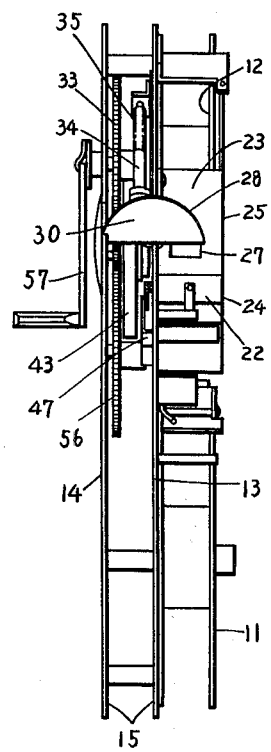
FIG. 3 is an end elevation view of the apparatus.
Figure 8:
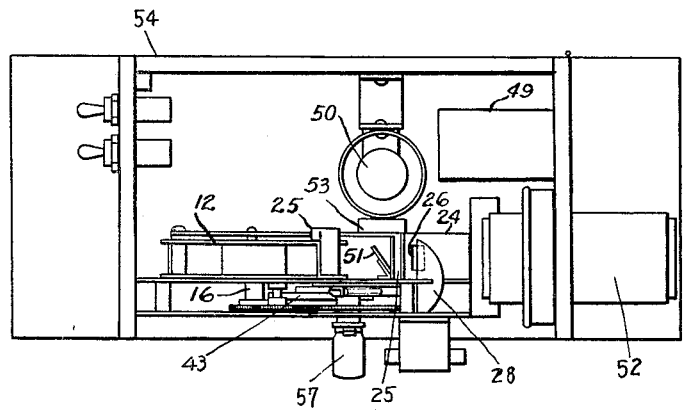
FIG. 8 is a plan view of the projector according to the present invention, with its top removed.
Figure 9:
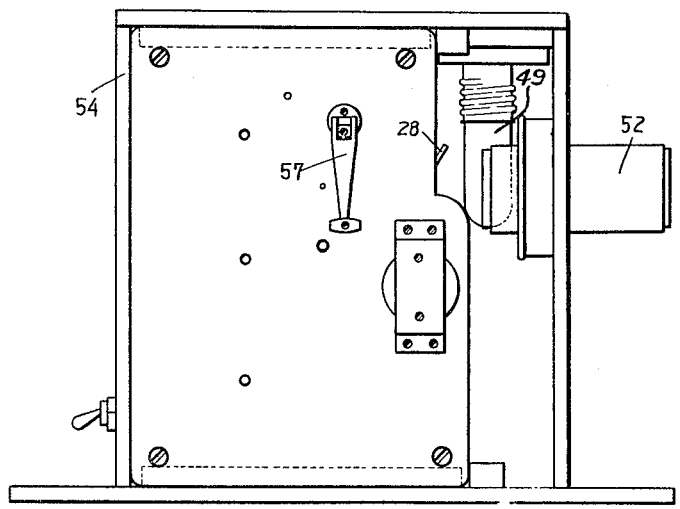
FIG. 9 is a side view of the apparatus shown in FIG. 8.

In FIGS. 8 and 9 is shown a projector for a developed film exposed in a movie camera according to the present invention. The mechanism for feeding the film and the shutter device are both just the same as those of the camera, and wherein the camera is provided with light sources 49 and 50 behind the exposing apertures 26 and 27, or a reflex mirror 51 to reflect light through the apertures if it is impossible to align the light source with the apertures, the camera apparatus can be converted to a projector, and a projecting lens furnished in place of the photographing lens unit. In this, like any conventional projector, a condenser must be installed in the usual place. Thus, by dint of the characteristics of the film feed mechanism and the shutter device, the principal parts of the camera can be used for a projector, set in a casing 54. And further, as shown in FIG. 2, a gear 55, engaged with the gear 41, revolves the sprocket wheel 18 by means of a gear 56. The numeral 57 designates a hand crank for driving the shaft 31, which may also be driven by a motor.

Figure 4:
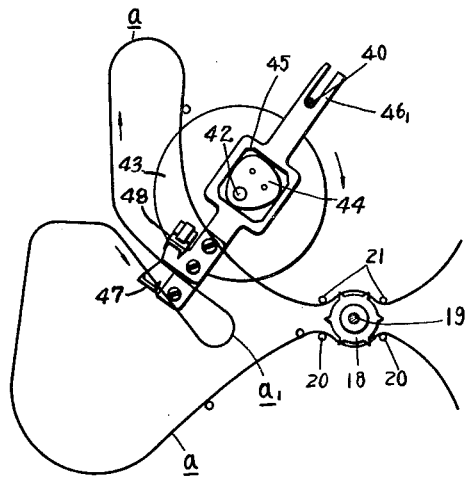
FIG. 4, 5, 6 and 7 are diagrammatic elevation views in which is shown the manner of feeding the film according to the present invention.
Figure 5:
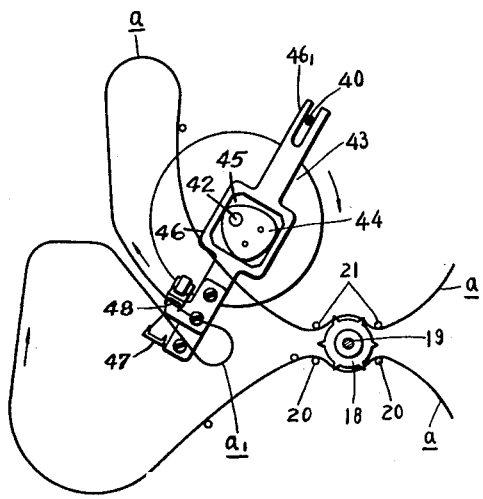
Figure 6:
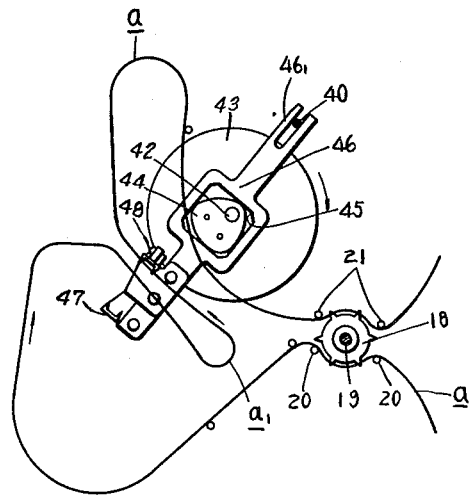
Figure 7:
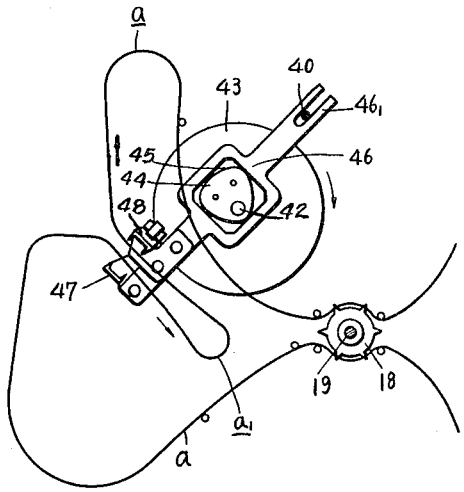

The photographing process according to the present invention is as follows. In FIG 1, the mirror 30 faces the exposing aperture 26 of the film guide means 24 behind the lens unit so that the light reflected thereon can fall upon the aperture 26, and the back of the mirror 30 keeps the exposing aperture 25 closed to the light coming through the lens unit. When the shaft 37 shown in FIG. 2 is revolved by means of the handle 57, the gear 36 is revolved by the worm 35 cooperating with the worm gear 32 and the shutter 28 is turned through 180 degrees and the light from the lens unit is allowed to pass and get to the exposing aperture 27. Thus the film $a$ is exposed alternately at two different places in rapid succession. In the apparatus of the invention, while one part of the film $a$ is exposed to the light reflected from the shutter 28, the other part thereof at the aperture 27, closed to the light, is moved into position to receive the next exposure, and then when the shutter 28 is revolved to let the light fall on the aperture 27, the exposed part of the film $a$ at the aperture 26 is fed along and the next part is moved into position for the next exposure. In this way the continuous photographing is performed without a break. While thus revolving the shutter 28, the shaft 31 rotates on one hand the reel 12 by means of the gears 33, 38 and 39 to wind up the film $a$ on it without a slack, and on the other hand, rotates the disc 43 clockwise by means of the gears 33 and 41, with the cam 44 on the shaft 42 also being turned in the same direction, so that the feed lever 46, which has the square opening 45 around the periphery of the cam 44, moves on a certain locus around the shaft 42 according to the thrusting motion of the cam 44, and at the same time, because the fork $46_1$ is engaged with the pin 40 eccentrically fixed on the gear 39, goes back and forth along a line through the shafts 16 and 42 during the anticlockwise circular motion of the pin 40. In FIG. 4, this feed lever 46 is shown in its highest position and the teeth 47 are engaged in the perforations of the film $a$ in the film guide means 24 to move the film in the direction of the arrow. In FIG. 5, the cam 44 is turning downward, the lever 46 descends guided by the circular motion of the pin 40, and the teeth 47 recede from the film guide means 24, while the teeth 48 engage in the perforations of the film $a$ within the film guide means 25 to move the film in the direction of the arrow. In FIGS. 6 and 7, the lever 46 begins to ascend, the teeth 48 recede from the film guide means 25 and the teeth 47 approach the film guide means 24 toward the position shown in FIG. 4. In this way, the film $a$ on the reel 11 is fed by the teeth 47, passing the exposing aperture 26, and then is further fed on by the teeth 48, and is taken up on the reel 12 after passing the exposing aperture 27. In this process the length of the film $a$ fed by the teeth 47 or 48 must always be twice the length of one exposure at the aperture 26 or 27. By this means, a first section of exposed film and a second unexposed section are fed together past aperture 26 to leave a third unexposed section present at the aperture 26, and an unexposed section which has been fed past the aperture 26 and a section which has been exposed there are fed together to the aperture 27 such that the unexposed section is opposite the aperture 27. For this kind of feed, the film cannot be fed straight but it must be fed in a loop, and the present invention provides a curved passage 60 between the two U-shaped concentric regulating plates 58 and 59 for forming the loop. The film $a$ fed by the teeth 47 is slackened on its way around the curved passage 60 so that the feeding action of the teeth 48 can take up this slack, and by fixing the length of the curved passage 60 properly, the film $a$ is accurately fed two sections at a time at each exposing aperture, the regulating plates 58 and 59 also acting as regulators for keeping the feed length no more or no less than two sections.

For projecting what is developed or further printed from the film obtained by this photographing apparatus, the camera described above can be used as it stands, the images of objects recorded at the apertures 26 and 27 being completely projected in the correct positions on the screen by sending them through a projecting lens 52 by means of the light sources 49 and 50 and the condensers 53, 53.

It is thought that the invention and its advantages will be understood from the foregoing description and it is apparent that various changes may be made in the forms, construction and arrangement of the parts without departing from the spirit and scope of the invention, the form hereinbefore described and illustrated in the drawings being merely a preferred embodiment thereof.

Having thus described my invention, what I claim and desire to secure by Letters Patent of the United States is:

1. In a motion picture apparatus, the combination of two film guide means each having a part thereof which is straight for guiding film along a path at least part of which is straight, the straight parts of said two guide means being at an angle to each other, the straight part of each guide means having an aperture therein opening toward the internal angle between said two guide means, a shutter having at least one portion thereof removed, said shutter being rotatably mounted between the straight parts of said two guide means and along a line bisecting the internal angle between said two guide means, one side of said shutter means being a reflecting surface, and a drive mechanism comprising gear means drivingly connected to said shutter for rotating said shutter, a single oscillating lever having film engaging means on the end thereof engaging the film in the respective guide means, a cam drive engaging said oscillating lever and to which said gear means is drivingly connected for oscillating said lever first in one direction along one of the guide means and then in a corresponding direction along the other film guide means for moving the film through the guide means in synchronism with the rotation of said shutter.

2. The combination as claimed in claim 1 in which said lever has an aperture therein, and said cam drive means comprises a cam eccentrically positioned in said aperture and engaging at least one side thereof, the other end of said lever having a slot therein, said gear means having a gear with a pin eccentrically mounted engaged in the slot in the other end of said lever, whereby when said gear means rotates said gear and said cam said lever is moved back and forth along its length and the said one end is moved back and forth perpendicular to said length.

3. The combination as claimed in claim 2 in which said film engaging means comprises a first plurality of teeth on said one end of said lever facing away from said cam and a further plurality of teeth on said one end of said lever and spaced along the length of said lever from said first plurality of teeth and facing toward said cam, said one end of said lever being adjacent the point toward which the straight parts of said two guide means converge, whereby when a loop of film is provided between the straight parts of said two guide means, one portion of the loop is engaged and driven in a direction from one to the other of the two guide means when the lever is moved in one direction, and the other portion of the loop is engaged and driven in the same direction when the lever is moved in the other direction.

References Cited by the Examiner

UNITED STATES PATENTS

| 875,333 | 12/07 | Dyer et al. | 88—19.5 |
| 924,147 | 6/09 | Curtiss. | |
| 1,924,901 | 8/33 | Ball | 88—19.3 |
| 2,449,483 | 9/48 | Iwick | 88—18.4 X |

FOREIGN PATENTS 402,198  11/33  Great Britain.

NORTON ANSHER, *Primary Examiner.*

EMIL G. ANDERSON, G. Y. CUSTER, *Examiners.*

UNITED STATES PATENT OFFICE
CERTIFICATE OF CORRECTION

Patent No. 3,176,313  March 30, 1965

Shinzaburo Yatera

It is hereby certified that error appears in the above numbered patent requiring correction and that the said Letters Patent should read as corrected below.

In the grant, lines 1 to 3, for "Shinzaburo Yatera, of Katano-cho, Kitakawachi-gun, Japan," read -- Shinzaburo Yatera, of Kantano-cho, Kitakawachi-gun, Osaka Prefecture, Japan, --; in the heading to the printed specification, lines 4 and 5, for "Shinzaburo Yatera, 3076 Oaza Kisabe, Katano-cho, Kitakawachi-gun, Japan" read -- Shinzaburo Yatera, 3076 Ohaza Kisabe, Katano-cho, Kitakawachi-gun, Osaka Prefecture, Japan --.

Signed and sealed this 26th day of October 1965.

(SEAL)
Attest:

ERNEST W. SWIDER
Attesting Officer

EDWARD J. BRENNER
Commissioner of Patents